United States Patent [19]
Khan

[11] 4,433,250
[45] Feb. 21, 1984

[54] POWER SUPPLY CONTROL APPARATUS

[75] Inventor: Jawed M. Khan, Clearwater, Fla.

[73] Assignee: GTE Business Communication Systems Inc., McLean, Va.

[21] Appl. No.: 402,867

[22] Filed: Jul. 29, 1982

[51] Int. Cl.³ .............................................. H02J 9/00
[52] U.S. Cl. ........................................ 307/66; 307/20; 307/28; 307/75
[58] Field of Search ....................... 307/20, 22, 23, 26, 307/28, 39, 66, 75

[56] References Cited
U.S. PATENT DOCUMENTS 4,342,922 8/1982 DiMassimo et al. .................. 307/66

Primary Examiner—E. A. Goldberg
Assistant Examiner—Derek Jennings

[57] ABSTRACT

Apparatus is adapted for connection to an alternating current source and a direct current power supply powered by the source. The supply is enabled when the source is operative and disabled when the source is inoperative. The apparatus utilizes first, second and third terminals. A power line monitor is connected at its input to said source and at its output to said first terminal. The monitor maintains the first terminal at a selected potential when the source is enabled, and is unable to maintain the first terminal at any potential when the source is disabled. A first circuit connected to the supply, a battery and the second terminal to charge said battery and to maintain the second terminal at a selected potential when the supply is enabled. The battery maintains the second terminal at the selected potential when the supply is disabled. The first circuit is connected via a resistor to the first terminal to maintain the first terminal at a different potential when the monitor is inoperative. An additional circuit is connected to the first circuit, the supply, the monitor and the third terminal to maintain the third terminal at a selected potential when the monitor is operative and to maintain the terminal at a different potential when the monitor is inoperative.

5 Claims, 1 Drawing Figure

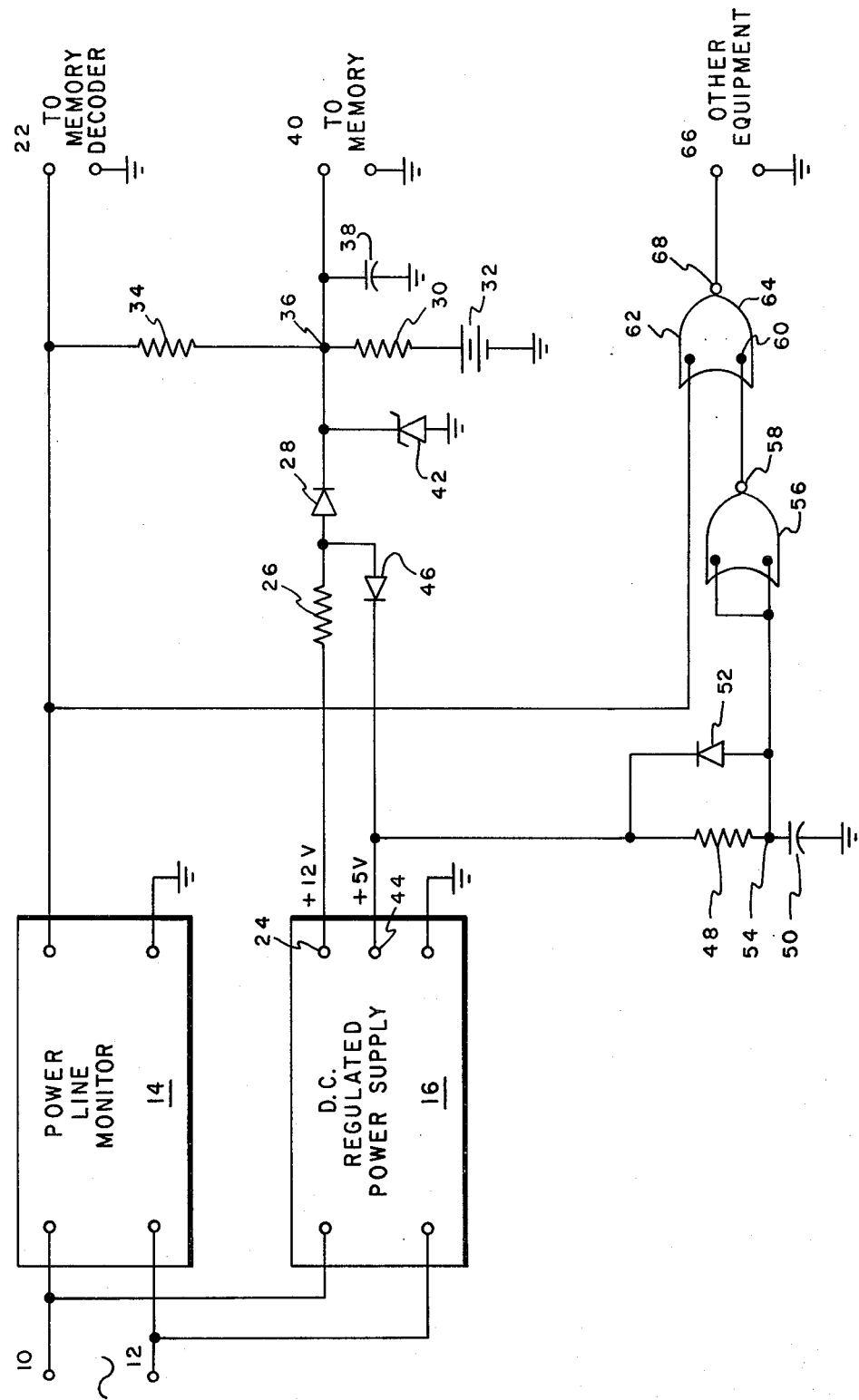

POWER SUPPLY CONTROL APPARATUS

BACKGROUND OF THE INVENTION

Certain new types of telephone instruments provide a variety of functions in addition to conventional functions in telephone service. In order to provide these new functions, these instruments obtain power from a local source of alternating current. In order of maintain telephone service in the event that the source becomes inoperative, it is necessary for the instrument to provide its own direct current power while disabling the equipment used in providing the additional functions. Some of this equipment contains stored information which cannot be erased when the source becomes inoperative and erasure will ensue if such direct current power is not available.

The present invention is directed toward power supply control apparatus which can be used in the new types of instruments to provide the protective actions described above.

SUMMARY OF THE INVENTION

In accordance with the principles of the invention apparatus is provided which is adapted for connection to an alternating current source and a direct current power supply powered from said source. The supply is enabled when the source is operative and is disabled when the source is inoperative. The apparatus includes first, second and third terminals, and a power line monitor connected at its input to said source and at its output to said first terminal. The monitor is operative to maintain said first terminal at a selected potential when the source is operative and is rendered inoperative and unable to maintain said first terminal at any potential when said source is inoperative.

The apparatus also includes first means connected to said supply, a battery and said second terminal to charge said battery and to maintain said second terminal at a selected potential when the supply is enabled. The battery maintains said second terminal at said selected potential when said supply is disabled. Second means is connected to said first means and said first terminal to maintain said first terminal at a different potential when said monitor is inoperative. Third means is connected to said first means, said supply, said monitor and said third terminal to maintain said third terminal at a selected potential when said monitor is operative and to maintain said third terminal at a different potential when said monitor is inoperative.

This apparatus, as will be explained in more detail below, enables various equipments to function properly when the source supplies power in the manner desired and provides appropriate control to prevent loss of stored information while disabling various equipments when the source is inoperative.

BRIEF DESCRIPTION OF THE DRAWINGS

The accompanying FIGURE is a circuit diagram of apparatus in accordance with the invention.

DETAILED DESCRIPTION OF PREFERRED EMBODIMENTS

Referring now to the FIGURE, an alternating low frequency voltage for example twenty-four volts sixty Hz, is applied between terminals 10 and 12 and thus is applied both to the input of power line monitor 14 and direct current regulated power supply 16. One output terminal 18 of monitor 14 is grounded. The other output terminal 20 of monitor 14 is connected to terminal 22.

A first output lead 24 from supply 16, maintained for example at a potential of twelve volts with respect to ground is connected through resistor 26, rectifier 28, resistor 30 and rechargeable battery 32 to ground. Resistor 26 is also connected through resistor 34 to terminal 22. The junction 36 of resistors 34 and 30 is grounded through capacitor 38 and is also connected to terminal 40. This junction is also grounded through zener diode 42.

A second output lead 44 from supply 16, maintained for example at a potential of five volts with respect to ground is connected via rectifier 46 to the junction of resistor 26 and rectifier 28.

Lead 44 is also connected via resistor 48 and capacitor 50 to ground, resistor 48 being shunted by rectifier 52. The junction 54 of the capacitor 50 and resistor 52 is connected as a single input to NOR gate 56 (which in this circuit is used only as an inverter). The output terminal 58 of the inverter and the terminal 20 of monitor 14 are connected to corresponding input terminals 60 and 62 of NOR gate 64. The output terminal 68 of gate 64 is connected to output terminal 66.

The circuit shown in the FIGURE is used on an electronic telephone in conjunction with a local power source to supply power to a memory decoder via terminal 22 and ground, to the memory itself via terminal 40 and ground, and to other equipments via terminal 66 and ground. Should the power from the source fail, battery 32 which has been maintained on trickle charge is switched into the system to supply direct current power to the memory to prevent loss of information stored therein while the decoder circuits and other equipments are disabled. When power from the source is restored, the circuit is restored and the battery is returned to charging condition.

The circuit functions as follows. When power from the local source is present, the monitor output terminal attains a selected low potential, for example, causing the decoder circuits to function normally. Supply 16 maintains terminal 40 at the desired direct positive potential value, for example 5 volts. The supply and monitor outputs cause the output 68 of gate to attain a suitable direct positive potential, for example, 4.8 volts, and the other equipment is enabled.

The battery which typically is nickel cadmium type rated at 3.6 volts is trickle charged via terminal 24 of the supply as previously described. The connection of terminal 44 via rectifier 46 to the junction of resistor 26 and rectifier 28 limits the direct voltage developed across the battery to a value for example, 5 volts, which will not damage the rectifier. Zener diode 42 is normally inoperative but is rendered operative should rectifier 46 fail to limit voltage in the same manner.

Should there be a power failure, the power monitor is disabled and potential at terminal 20 disappears. Supply 16 is disabled.

Battery 32 then supplies direct current power between terminal 40 and ground to maintain memory power as previously described. The potential at terminal 20 is raised by battery action to a value at which the decoder is disabled. The potential at terminal 68 is raised whereby the other equipments are disabled.

When local alternating current power is restored, the circuit returns to its original state.

The circuit of the power monitor unit is not shown since this unit is purchased as an integrated circuit designated as type MID 400 and sold by General Instrument Corporation.

What is claimed is:

1. Apparatus adapted for connection to an alternating current source and a direct current power supply powered by said source, said supply being operative when the source is enabled and being disabled when the source is inoperative, said apparatus comprising:

first, second and third terminals;

a power line monitor connected at its input to said source and at its output to said first terminal, said monitor being operative to maintain said first terminal at a selected potential when the source is operative, said monitor being rendered inoperative and being unable to maintain said first terminal at any potential when said source is inoperative;

a battery;

a first resistor connected in circuit with said battery;

first means connected to said supply, said first resistor and said second terminal to charge said battery and to maintain said second terminal at a selected potential when the supply is disabled;

a second resistor connected between said first resistor and said first terminal to maintain said first terminal at a different potential when said monitor is inoperative; and second means connected to said first terminal, said supply, and said third terminal to maintain said third terminal at a selected potential when said monitor is operative and to maintain said third terminal at a different potential when said monitor is inoperative, said second means including a NOR gate having an output connected to said third terminal, a first input coupled to said supply and a second input connected to said first terminal.

2. Apparatus as set forth in claim 1 wherein said first means includes a third resistor and a first rectifier connected in series between said supply and said first resistor.

3. Apparatus as set forth in claim 2 wherein said first rectifier is disposed between said first and third resistors.

4. Apparatus as set forth in claim 3 wherein said first means includes another rectifier connected between the supply and the junction of the third resistor and first rectifier.

5. Apparatus as set forth in claim 4 wherein said one input is connected to said supply through an inverter.

* * * * *